July 7, 1959 G. B. LONG ET AL 2,894,105
DOMESTIC APPLIANCE
Filed Oct. 10, 1956 4 Sheets-Sheet 1

INVENTORS
RAY E. CLEVER
GEORGE B. LONG
BY Edwin S. Dybvig
THEIR ATTORNEY

INVENTORS
RAY E. CLEVER
GEORGE B. LONG
BY
THEIR ATTORNEY

July 7, 1959 G. B. LONG ET AL 2,894,105
DOMESTIC APPLIANCE
Filed Oct. 10, 1956 4 Sheets-Sheet 4

INVENTORS
RAY E. CLEVER
GEORGE B. LONG
BY
Edwin S. Dybvig
THEIR ATTORNEY

United States Patent Office 2,894,105
Patented July 7, 1959

2,894,105

DOMESTIC APPLIANCE

George B. Long and Ray E. Clever, Dayton, Ohio, assignors to General Motors Corporation, Detroit, Mich., a corporation of Delaware Application October 10, 1956, Serial No. 615,193

7 Claims. (Cl. 219—20)

This invention relates to domestic appliances and more particularly to an automatic control for a top heater of an electric range or the like.

An object of this invention is to provide a thermostatic control having a thermistor responsive to the temperature of a utensil being heated and the resistance of which varies as its temperature varies, said thermistor being in series with a low voltage temperature controlling hot wire arrangement, said hot wire being connected mechanically with a voltage compensating hot wire in a manner to adjust the hot wire arrangement in accordance with voltage variations in the power supply of the heater on the range.

Another object of this invention is to provide a wattage controlling, adjustable, pulsating relay element and a by-pass around said relay element in combination with the structure of the foregoing object, in such a manner that full, continuous wattage is fed through the by-pass to the heater during the heating-up period of the utensil being heated, and thereafter the wattage is reduced by pulsations of said pulsating relay element as the temperature of the utensil reaches the selected temperature.

Another object of this invention is to provide an adjustment for said wattage pulsating relay in which the "on" period of the pulsation is increased in relative length of the "off" period as the control is adjusted to a higher temperature setting.

Another object of the invention is to provide a mechanical compensating construction associated with the above low voltage hot wires to compensate for the curved resistance-temperature graph characteristics of the thermistor and the substantially straight line graph characteristics of the compensating hot wire on the normal operating range.

Another object of this invention is to provide a control for a heater including a pulsating relay having periodically opening and closing contacts actuated by a current sensing element, such as a hot wire, and including a by-pass line around said contacts and in series with the sensing element which energizes the heater continuously during the heating up period and opens the contacts during the heating period whereby the selected temperature is not overshot when reached.

Further objects and advantages of the present invention will be apparent from the following description, reference being had to the accompanying drawings wherein a preferred embodiment of the present invention is clearly shown.

Figure 1:
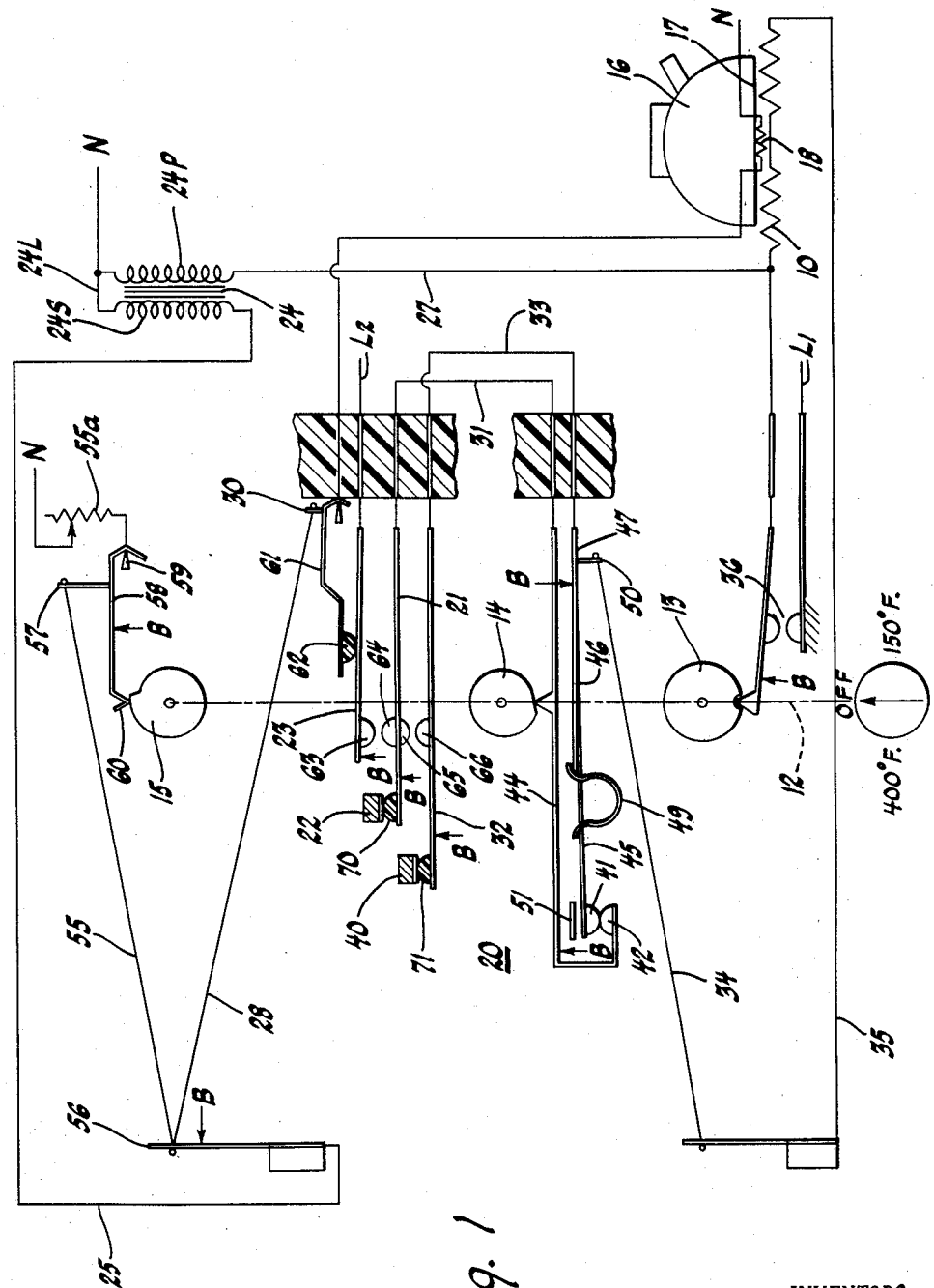
Figure 1 is a diagrammatic structural and wiring illustration of the control in relation to the heater and utensil, the control being set in the "off" position.
Figure 2:
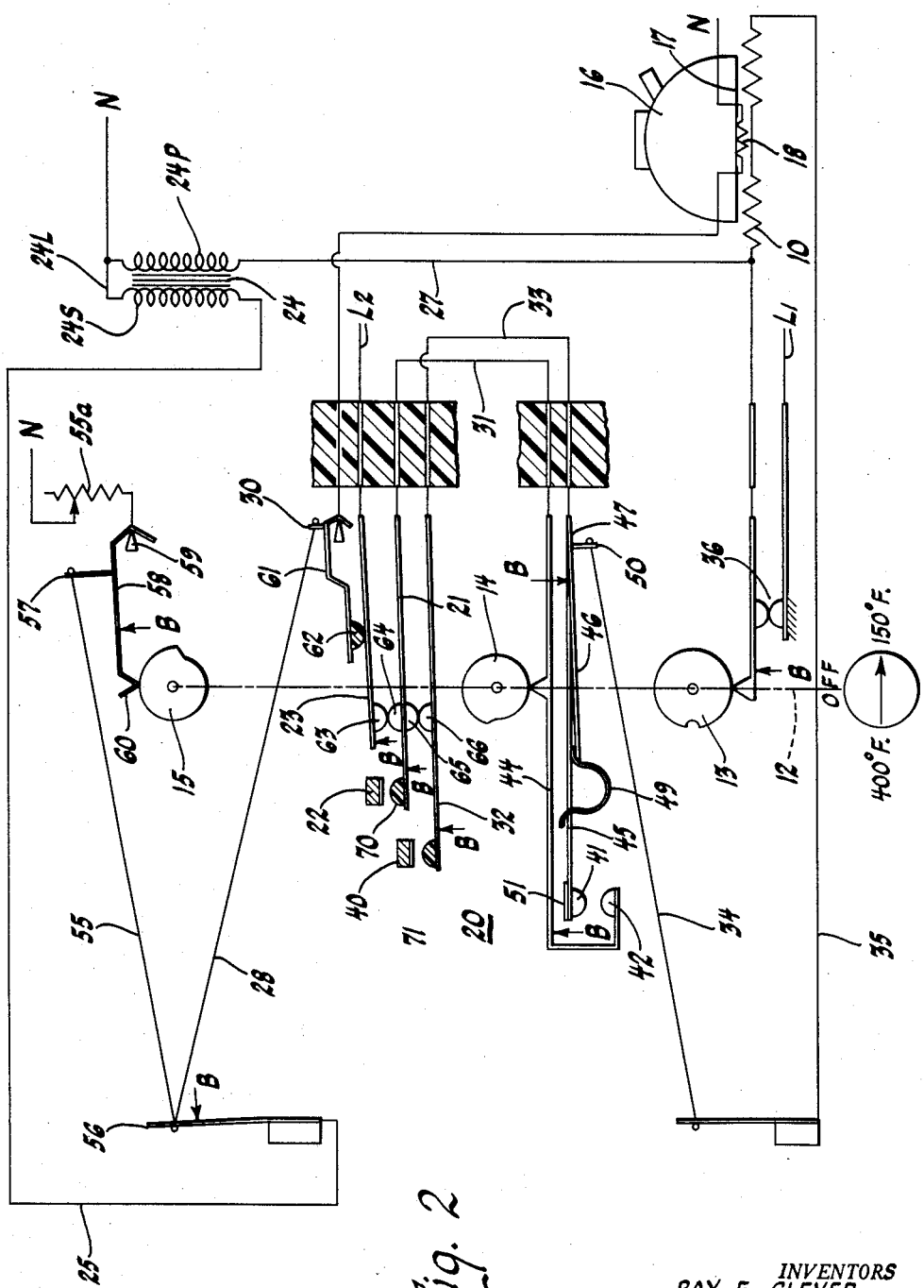
Figure 2 is a diagram similar to Figure 1 showing the position of the switches when the control has just been turned on to position "warm" and before the utensil has become heated.
Figure 4:
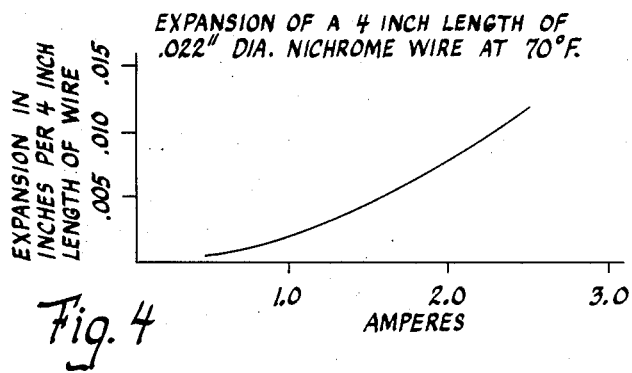
Figure 4 is an expansion-current graph of a bare Nichrome wire suitable for use as a low voltage "hot" wire in this invention.
Figure 9:
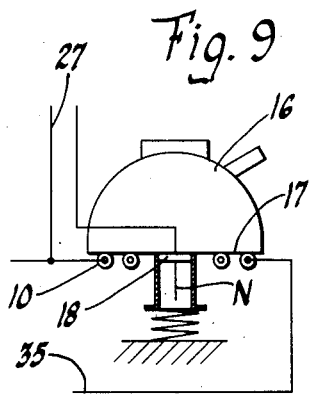
Figure 9 shows the structural mounting of the thermistor.

Referring particularly to Figures 1 and 2, a control for the electric heater 10 is turned on and off and is adjusted to the desired temperature setting by the knob 11 which rotates the shaft 12 and the on-off cam 13, the wattage controlling cam 14 and the temperature-off cam 15.

The electric heater 10 is adapted to heat an object, such as the utensil 16, which may be a teakettle, frying pan, or the like. The heater 10 contacts and/or heats a portion of the bottom 17 of the utensil, such as its outer periphery, to heat its contents. The thermistor 18 is in thermal contact with a portion of the bottom 17 of the utensil, such as its center, so the thermistor is heated and cooled in response to the temperature of the utensil 16 and its contents.

The thermistor 18 may be made of any of the well-known materials which have a decreasing electrical resistance as the thermistor increases in temperature. For example, it may be made of suitable sintered metal oxides, such as iron oxide. The temperature-resistance characteristics of one well-known thermistor, now on the market, are shown in the curved graph disclosed in Figure 3, which shows the non-linear or curved graph characteristics of the thermistor in its normal operating temperature range.

The control additionally includes a hot wire, wattage controlling, adjustable, pulsating relay element 20. It also includes a temperature controlling yieldable contact element 21 biased toward the arresting stop 22. The directions of bias of the various elements are shown by the arrows "B" in the drawings. A temperature controlling pulsating contact element 23 engages the yieldable contact 21 and pulsates it toward and away from the arresting stop 22. The above elements 20, 21, 22, and 23 are in electrical series between the two high voltage connectors $L_1$ and $L_2$ which are adapted to be connected to the two high potential wires of the usual three wire 220 volt power supply, or the like.

A step down transformer 24 provides a source of low voltage power such as 2.5 volts, between the wire 25 and any neutral grounded wire N. The transformer 24 may have its primary coil 24P energized between one of the connectors L1, by the wire 27, and any grounded wire N which is also adapted to be connected to the intermediate wire of the usual three wire 220 volt power supply.

Figure 3:
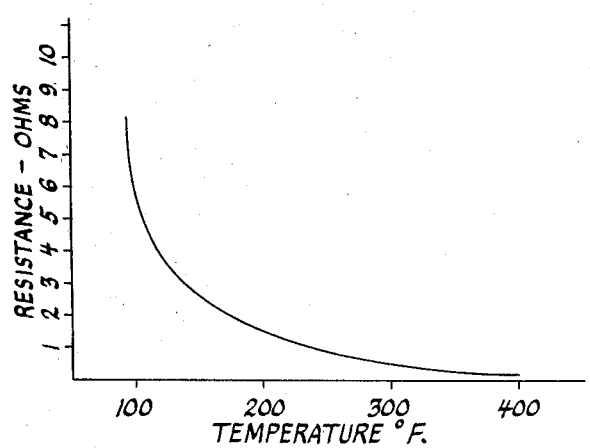
Figure 3 is a resistance-temperature graph of the thermistor.

A low voltage temperature controlling hot wire 28 and the thermistor 18 are in series across the source of low voltage from wire 25 to a neutral wire N near thermistor 18. Wire 28 preferably is a Nichrome wire .022 inch in diameter. Since the thermistor 18 is heated and cooled in response to the temperature of utensil 16 and its contents, and since the thermistor resistance decreases as its temperature increases, as shown in Figure 3. The current passing through hot wire 28 increases as the utensil temperature increases and vice versa. This likewise lengthens wire 28 when the utensil is hot and shortens the wire 28 when the utensil is cold. In Figure 2 when the utensil 16 is not heated, the resistance in thermistor 18 is relatively larger and the current in wire 28 is relatively small, so wire 28 is relatively cool and is contracted. This causes it to pull lever 30 rightward (Fig. 2) and contact element 23 downward against yieldable contact 21. This would cause current to flow from L₂, contacts 23 and 21, line 31, and relay 20, except that contact element 21 is ordinarily pushed down sufficiently to engage bypass contact 32, which bypasses the current around relay 20 through bypass line 33, hot wire 34, line 35, heater 10, on-off switch 36, to connector L₁. Under these conditions, substantially full wattage is fed to heater 10 during the heating up period of utensil 16.

When the utensil 16 almost reaches the selected temperature (such as "warm" in Fig. 2), the temperature of thermistor 18 rises and its resistance decreases to the point when the increased current through wire 28 causes it to elongate and move contacts 21 and 23 upwardly away from the upwardly biased bypass contact 32, which is arrested by stop 40. This forces the current to flow through the pulsating relay 20, thereby reducing the wattage per unit of time which is fed through heater 10. The relay 20 may be any well-known hot wire type of relay which causes movable contact 41 to snap and close against the adjustable "stationary" contact 42 when the hot wire 34 cools and contracts, and vice versa. The "on" time of relay 20 is increased relatively to the "off" time by downwardly adjusting contact 42, and vice versa, by turning spiral cam 14 against the follower 43 carried by the upwardly biased carrier 44. The contact 41 is carried by a blade construction 46, which pivots or bends about fulcrum point 47. Another blade 45 downwardly biased also pivots about fulcrum 47. One of the blades 45 or 46 straddles the other blade and the compression "C" spring 49 engages these blades to produce a reverse snap action. When the hot wire 34 heats due to passage of current through it, it elongates and allows lever 50 to move counterclockwise, and at the same time moving blade 45 downwardly until its left end passes below blade 46 at which time blade 46 snaps up to open the relay at contacts 41 and 42, contact 41 being arrested by insulated stop 51 mounted on carrier 44. The opening of relay contacts 41 and 42 stops the flow of current to produce an "off" time in heater 10 and wire 34. This "off" time is terminated when the wire 34 cools and contracts enough to pull the blade 45 up above blade 46 which causes "C" spring 49 to snap contact 41 against contact 42 to start an "on" period, which is terminated when the wire 34 reheats and snaps the contacts open. Adjusting contact 42 to a lower position, as in "boil" and "fry" positions of knob 11 requires the wire 34 to heat longer to a higher temperature before the contacts 41 and 42 are opened, thus increasing the "on" time relatively to the "off" time of the relay. The wire 34 also cools faster from the higher temperature, thus shortening the "off" time. While a certain type of pulsating relay has been shown diagrammatically, any other equivalent type of pulsating relay or switch may be used instead.

The high voltage current passes through the hot wire 34 during the heating-up period when the bypass 33 is effective. This is an advantage because the pulsing contacts 41 and 42 are quickly opened by the heating of wire 34, and the contacts 41 and 42 are maintained open during the heating up period. This prevents overshooting of the selected temperature because all current to heater 10 is shut off immediately when the contacts 65 and 66 are opened and permits the pulsating relay to start controlling the heater in the open position, rather than in the closed position of the previous devices.

During warmup, at first, all contacts 63, 64, 65, and 66 are closed, and high continuous power is applied to heater 10 from L₁, 36, 10, 35, 34, 50, 33, 66, 65, 64, 63, and L₂. This operates pulsating relay 20 to open contacts 41 and 42. However, since the utensil 16 is considerably below the desired temperature, contacts 66, 65, 64, and 63 keep the heater 10 continuously energized for high input.

As the utensil 16 approaches the selected temperature, contacts 65, 66 open. Since the pulsating relay wire 34 is heated and contacts 41 and 42 are opened, all power is removed from the heater. With a light load in utensil 16, contacts 64, 63 will open before contacts 41 and 42 will close, so no further power will be applied until after all excess heat is used from the heater.

As the load in 16 cools, contacts 64, 63, close and the pulsating relay 20 applies pulsating current (at timed intervals) to maintain the desired temperature.

If the power pulsations from relay 20 cause overheating, contacts 63, 64 will open and stop the power. If the power pulsations from relay 20 are insufficient to maintain the desired temperature in utensil 16, contacts 65 and 66 will close and apply continuous power until the selected temperature is restored.

A voltage variation compensator hot wire 55 is provided to compensate for the current fluctuations through wire 28 due to voltage variations in the high voltage connectors L₁ and L₂ and consequently producing corresponding low voltage variations between wire 25 and N. (It is to be noted that the transformer primary 24P is shown energized between L₁ and N. It can be energized between L₁ and L₂, if desired, and the transformer secondary 24S may feed low voltage current between the line 25 and lines between points marked 24L, if desired, for substantially the same effect.)

The compensator wire 55 may also be used to provide an off switch at 23 for line L₂ and also to provide a temperature adjustment for temperature controlling wire 28. For this purpose, the wires 28 and 55 are secured at their left ends (Figs. 1 and 2) to the leftwardly biased strong spring 56. The right end of wire 55 is connected to the lever 57 carried by the lever 58 which is fulcrumed at 59. The follower 60 of lever 58 rides on cam 15. When the follower 60 is raised by the off hill of cam 15, as in Figure 1, the wires 55 and 28 and spring 56 are moved rightward, allowing upwardly biased spring blade 23 to push lever 61 and insulator contact 62 up so contact 63 is moved away from contact 64 of upwardly biased blade 21, which is stopped in its upward movement by stop 22. At that time contact 65 is spaced a very small distance from contact 66. No current can flow to heater 10 because of the opening of contacts 63 and 64.

The effective resistance portion of wire 55 is preferably identical in length, diameter, resistance and material with wire 28. Wire 55 is connected to resistance 55a and a neutral wire N. The resistance 55a preferably is chosen to have the same ohm rating as thermistor 18 when thermistor 18 is at some intermediate temperature such as 250°. At this temperature, if the line voltage varies, the differences in expansion in wires 28 and 55 are equal, and thus the wire 55 compensates for any fluctuations in line voltage. It also substantially compensates for variations in line voltages at all the other temperature settings.

The wire 55 also adjusts the temperature setting of the controller. This is accomplished when the follower 60 moves downwardly to the position on cam when it is turned to any of the "warm," "boil," or "fry" positions, or intermediate positions. The cam 15 has its lowest point adjacent the "fry" position and is gradually (spirally) increased upwardly through the "boil" and "warm" positions to the highest position at "off".

When the cam 15 has been moved to the "warm" position, for example, as in Figure 2, the wires 55 and 28 and spring 56 are moved slightly leftward from the position of Figure 1 to that of Figure 2. This closes all of the contacts 63, 64, 65, and 66 and it requires a certain elongation of wire 28 by the flow of current through wire 28 and thermistor 18 (corresponding to "warm") to open these contacts and shut off the current to heater 10. When the knob 11 and cam 15 are moved to the "boil" or "fry" position, the cam 15 moves the follower 60 slightly lower than in the "warm" position. This moves the wires 28 and 55 slightly more leftward and requires a greater elongation of the wire 28 before the contacts 63 and 64 are opened to deenergize the heater 10.

It is to be noted that "contacts" 62, 70, 71, 51, and cams 13, 14, and 15 are made of electrically insulating material. Contacts 63, 64, 65, 41, 42, and 36 are made of electrically conducting material.

If it is desired to compensate for line voltage variations more accurately than in Figures 1–4, a mechanical compensating connection between the wires 28 and 55 may be used, as shown in Figures 5–8 and 10.

All of the members previously described with respect to Figures 1–4, which are designated by similar numerals operate in the same manner in Figures 5–8 as in Figures 1–4.

In Figures 5–8, the compensator wire 55 is attached to the spring 56 substantially as in Figures 1 and 2. Wire 28, however, passes freely through a vertical slot 79 in spring 56, and is attached to a rocker block 80 which is carried by the rightwardly biased spring 81. The spring 81 and block 80 are energized by line 25 as at 25a. The wire 55 may pass through a wedge shaped opening 82 in block 80 and may be attached to the rear of the block, or a large hole 83 may be drilled in block 80 from the rear to a point near the front, after which a small hole 84 may be drilled, and the wire 28 may be passed through the small hole 84 and may be attached by a calibrating thread and nut construction at 85 as in Figure 10. The wire 55 may be attached to spring 56 by a similar thread and nut construction for calibration.

Figure 5:
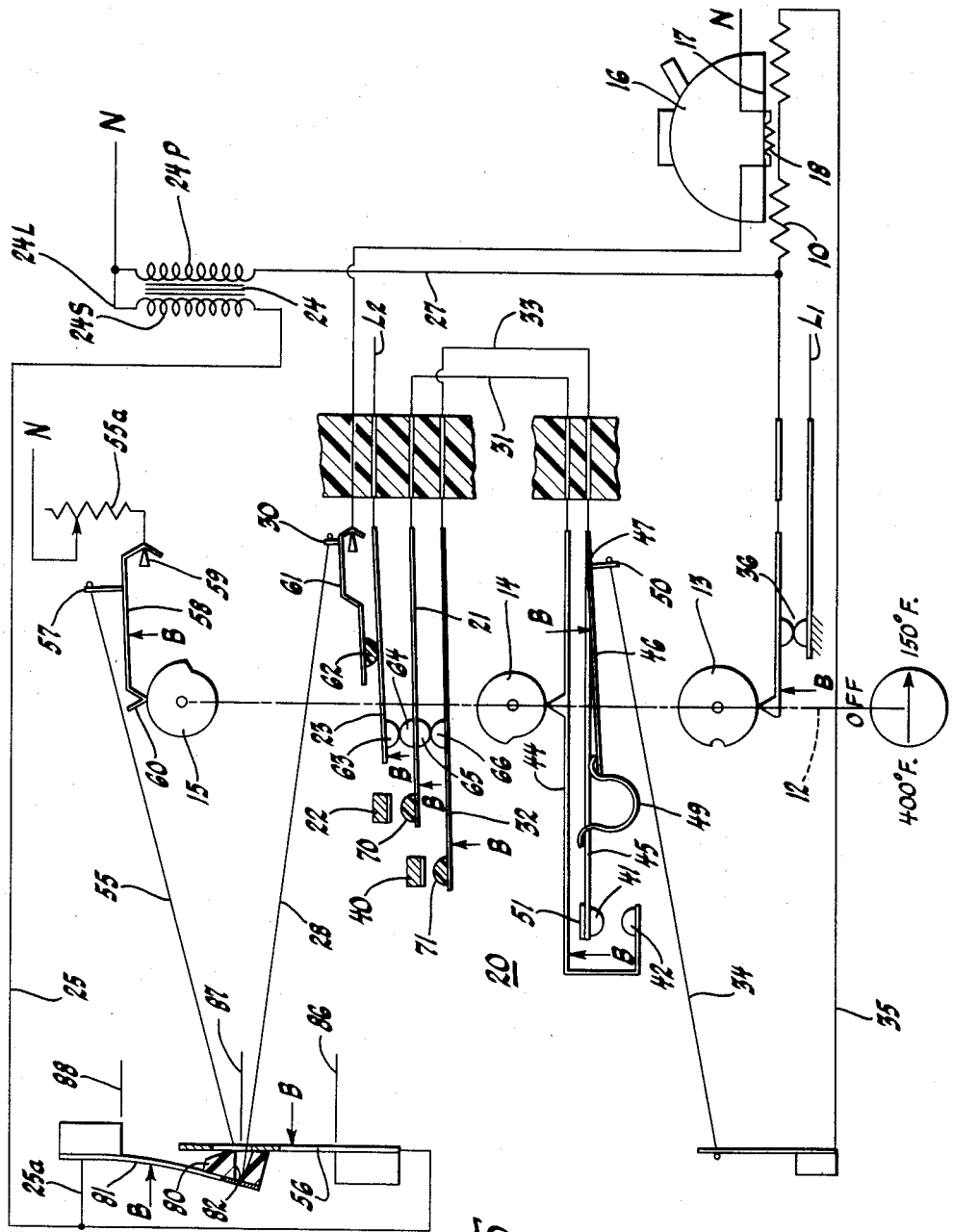
Figure 5 is a view similar to Figure 2 showing the mechanical compensator.

The wires 28 and 55 pass through the same horizontal line in spring 56 in Figure 5, in the "warm" position, so the left ends of the wires travel the same distance leftward or rightward from their normal 220 line voltage position if the line voltage should increase (or decrease) materially, such as 10%. For example, the distance from plane 86 to plane 87 may be ¾ inch, and the distance from plane 87 to plane 88 may be 1 inch.

Figures 6, 7:
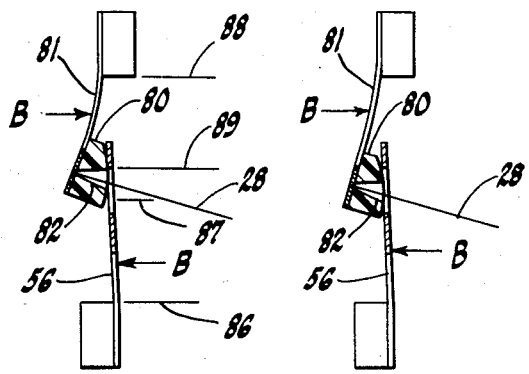
Figure 6 is a portion of Figure 5 shown in the "boil" position.
Figure 7 is a view similar to Figure 6 in the "fry" position.
Figure 8:
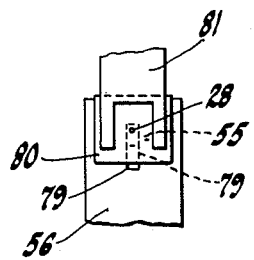
Figure 8 is a side view of a portion of Figure 7.
Figure 10:
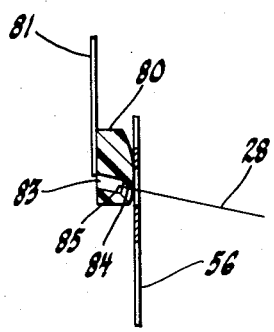
Figure 10 is a modification of part of Figures 5–8.

If the knob 11 should be adjusted to the "fry" position, then the block 80, wires 28 and 55 etc., move to the position of Figure 7, where the block 80 and spring 56 contact each other on the horizontal plane 89. The vertical distance between planes 87 and 89 may be ¼ inch, so that now the "lever" from 86 to 89 is 1¼ inch and the "lever" between planes 88 and 89 is ¾ inch. Under these conditions, if the wire 55 should elongate beyond its normal 220 line voltage position because of an increase in line voltage and move its left end leftward slightly then the left end of wire 28 will be moved leftward a great deal more than the movement of the left end of wire 55. An intermediate condition will prevail in the "boil" position, as is evident from Figure 6.

The structure of Figures 5–8 or 10 compensates for the fact that much more additional current passes through wire 28 than through wire 55 in the "fry" range the line voltage increases from normal. This causes wire 28 to elongate from normal more than wire 55 when there is a line voltage increase while the parts are in the "boil" position. On the other hand, the wires 28 and 55 elongate equally from normal when the parts are in the "warm" range during a line voltage increase and vice versa. Hence it is desirable to have wire 55 compensate wire 28 equally in the "warm" position and to compensate such wire a great deal more in the "boil" position as is evident from the graphs shown in Figures 3 and 4.

While the embodiment of the present invention as herein disclosed, constitutes a preferred form, it is to be understood that other forms might be adopted.

What is claimed is as follows:

1. In combination: an on-off switch element; a heater element; a hot wire, wattage controlling, adjustable, pulsating relay element; a temperature controlling yieldable contact element biased against an arresting stop; a temperature controlling movable contact element engaging said yieldable contact and moving it toward and away from said arresting stop, said elements being in electrical series between two high voltage connectors; a bypass around said pulsating relay element including a bypass contact engaging with said yieldable contact element when moving away from said stop; a transformer providing a source of low voltage power from at least one of said connectors; a low voltage temperature controlling hot wire and a thermistor directly in series across said source of low voltage, said thermistor being heated and cooled in response to the temperature of a utensil being heated by said heater and said last named hot wire operating said temperature controlling contact in response to increase and decrease in length of said wire due to current fluctuations through said wire and thermistor; an on-off cam opening and closing said on-off switch; a wattage controlling cam adjusting the frequency of pulsation of said pulsating relay to vary the wattage input into said heater; a temperature cam adjusting the operation of said low voltage controlling hot wire to open and adjust said temperature controlling movable contact; and a manual control for adjusting said cams.

2. In combination: an on-off switch element; a heater element; a hot wire, wattage controlling, adjustable, pulsating relay element; a temperature controlling yieldable contact element biased against an arresting stop; a temperature controlling movable contact element engaging said yieldable contact and moving it toward and away from said arresting stop, said elements being in electrical series between two high voltage connectors; a bypass around said pulsating relay element including a bypass contact engaging with said yieldable contact element when moving away from said stop; a transformer providing a source of low voltage power from at least one of said connectors; a low voltage temperature controlling hot wire and a thermistor directly in series across said source of low voltage, said thermistor being heated and cooled in response to the temperature of a utensil being heated by said heater and said last named hot wire operating said temperature controlling contact in response to increase and decrease in length of said wire due to current fluctuations through said wire and thermistor; an on-off cam opening and closing said on-off switch; a wattage controlling cam adjusting the frequency of pulsation of said pulsating relay to vary the wattage input into said heater; a compensator hot wire receiving current at potentials proportional to variations in the potentials of said high voltage current and connected to one portion of said low voltage temperature adjusting hot wire; a temperature cam adjusting the operation of said low voltage controlling hot wire to open and adjust said temperature controlling movable contact; and a manual control for adjusting said cams.

3. In combination: an on-off switch element; a heater element; a hot wire, wattage controlling, adjustable, pulsating relay element; a temperature controlling yieldable contact element biased against an arresting stop; a temperature controlling movable contact element engaging said yieldable contact and moving it toward and away from said arresting stop, said elements being in electrical series between two high voltage connectors; a bypass around said pulsating relay element including a bypass contact engaging with said yieldable contact element when moving away from said stop; a transformer providing a source of low voltage power from at least one of said connectors; a low voltage temperature controlling hot wire and a thermistor in series across said source of low voltage, said thermistor being heated and cooled in response to the temperature of a utensil being heated by said heater and said last named hot wire operating said temperature controlling contact in response to increase and decrease in length of said wire due to current fluctuations through said wire and thermistor; an on-off cam opening and closing said on-off switch; a wattage controlling cam adjusting the frequency of pulsation of said pulsating relay to vary the wattage input into said heater; a compensator hot wire receiving current at potentials proportional to variations in the potentials of said high voltage current and connected to one portion of said low voltage temperature adjusting hot wire; a mechanical compensating construction between said compensator hot wire and said temperature controlling hot wire to compensate for the curved resistance-temperature graph characteristics of said thermistor and the substantially straight line expansion-current graph characteristics of said compensator hot wire; a temperature cam adjusting the operation of said low voltage controlling hot wire to open and adjust said temperature controlling movable contact; and a manual control for adjusting said cams.

4. In combination: an electric heater adapted to be energized by a source of high voltage current subject to voltage variations; a controller for said heater including a thermistor responsive to temperatures of an object being heated by said heater and having curved resistance-temperature graph characteristics and a hot wire movable relay in which the hot wire is directly in series with said thermistor in a low voltage electric current, the voltage of which varies proportionally to the voltage variations in said high voltage current; and a compensating hot wire acting on a portion of said first named hot wire, said compensating hot wire being in a current, the voltage of which varies proportionally to the voltage variations in said high voltage current.

5. In combination: an electric heater adapted to be energized by a source of high voltage current subject to voltage variations; a controller for said heater including a thermistor responsive to temperatures of an object being heated by said heater and having curved resistance-temperature graph characteristics and a hot wire movable relay in which the hot wire is directly in series with said thermistor in a low voltage electric current, the voltage of which varies proportionally to the voltage variations in said high voltage current; a compensating hot wire acting on a portion of said first named hot wire, said compensating hot wire being in a current, the voltage of which varies proportionally to the voltage variations in said high voltage current; and a mechanical compensating construction between said hot wires to compensate for the curved resistance-temperature graph characteristics of said thermistor and the substantially straight line expansion-current graph characteristics of said compensating hot wires in their normal operating range.

6. In combination: an electric heater adapted to be energized by a source of high voltage current subject to voltage variations; a controller for said heater including a thermistor responsive to temperatures of an object being heated by said heater and having curved resistance-temperature graph characteristics and a hot wire movable relay in which the hot wire is directly in series with said thermistor in a low voltage electric current, the voltage of which varies proportionally to the voltage variations in said high voltage current; a compensating hot wire acting on a portion of said first named hot wire, said compensating hot wire being in a current, the voltage of which varies proportionally to the voltage variations in said high voltage current; a wattage varying switch in series with said electric heater; and a knob-cam construction adjusting the temperature setting of said hot wire movable relay and the wattage output of said wattage varying switch.

7. In combination: a heater adapted to be energized from a source of electric power; a variable, contactless control in the circuit from said source and operative in response to the approximate reaching of a selected temperature produced by said heater; a pulsating relay having a hot wire and contacts opened and closed by said hot wire and opening and closing the circuit from said source to said heater, said hot wire being in series with said control and continuously in said circuit; and a bypass connection around said contacts rendering said relay ineffective while said control is closed and becoming effective when said control is opened.

References Cited in the file of this patent

UNITED STATES PATENTS

| | | |
|---|---|---|
| 2,137,073 | Bletz | Nov. 15, 1938 |
| 2,260,840 | Rowe | Oct. 28, 1941 |
| 2,354,933 | Winbourne | Aug. 1, 1944 |
| 2,410,013 | Clark | Oct. 29, 1946 |
| 2,410,014 | Clark | Oct. 29, 1946 |
| 2,767,296 | Welch | Oct. 16, 1956 |
| 2,790,057 | Schauer | Apr. 23, 1957 |
| 2,811,627 | Fry | Oct. 29, 1957 |
| 2,816,999 | Fry | Dec. 17, 1957 |